Figure 8:
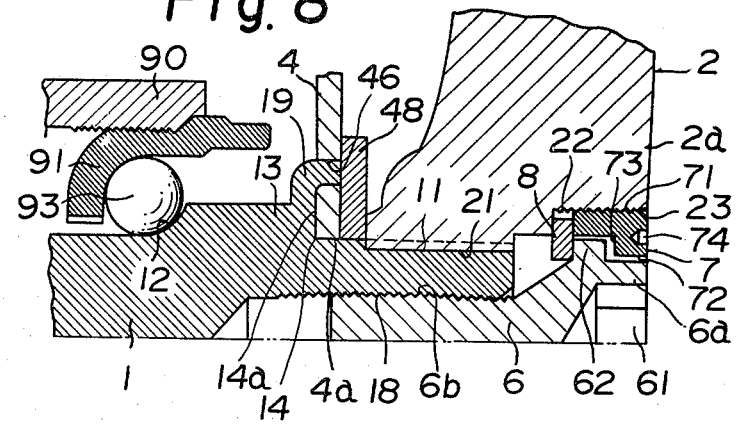

United States Patent [19]

Segawa

[11] 4,300,411
[45] Nov. 17, 1981

[54] GEAR CRANK FOR A BICYCLE

[75] Inventor: Takashi Segawa, Sakai, Japan

[73] Assignee: Shimano Industrial Company Limited, Osaka, Japan

[21] Appl. No.: 47,563

[22] Filed: Jun. 11, 1979

[30] Foreign Application Priority Data

Jun. 12, 1978 [JP] Japan ............................ 53-80968[U]
Jun. 12, 1978 [JP] Japan ............................ 53-80969[U]

[51] Int. Cl.³ .......................... G05G 1/14; B62M 1/02
[52] U.S. Cl. ................................................. 74/594.2
[58] Field of Search .................. 74/594.1, 594.2, 594.3

[56] References Cited

U.S. PATENT DOCUMENTS 652,972 7/1900 Lusebrink .......................... 74/594.2
4,201,120 5/1980 Segawa ............................. 74/594.2

FOREIGN PATENT DOCUMENTS 850275 9/1952 Fed. Rep. of Germany ..... 74/594.1
Ad.59702 2/1954 France ............................. 74/594.1
11545 of 1895 United Kingdom .............. 74/594.2
1219 of 1909 United Kingdom .............. 74/594.1
356497 9/1931 United Kingdom .............. 74/594.2

Primary Examiner—James Kee Chi
Attorney, Agent, or Firm—Stevens, Davis, Miller & Mosher

[57] ABSTRACT

A gear crank for a bicycle comprises a crank shaft, a pair of crank arms and at least one chain gear, the crank shaft carrying at its one axial end one of the crank arms and a larger diameter portion onto which the chain gear is connected not-rotatably with respect to the crank shaft.

3 Claims, 15 Drawing Figures

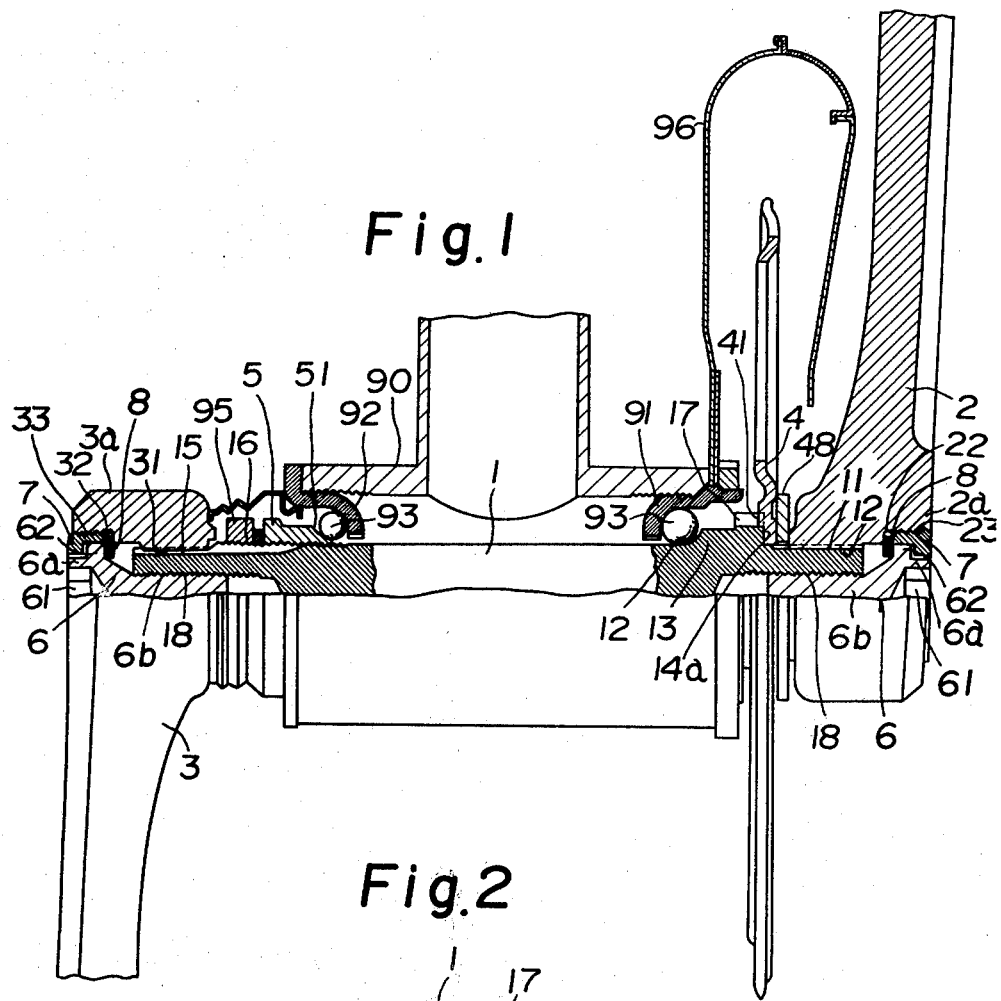
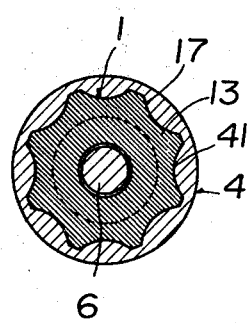
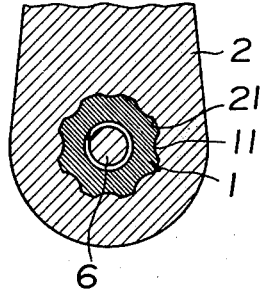

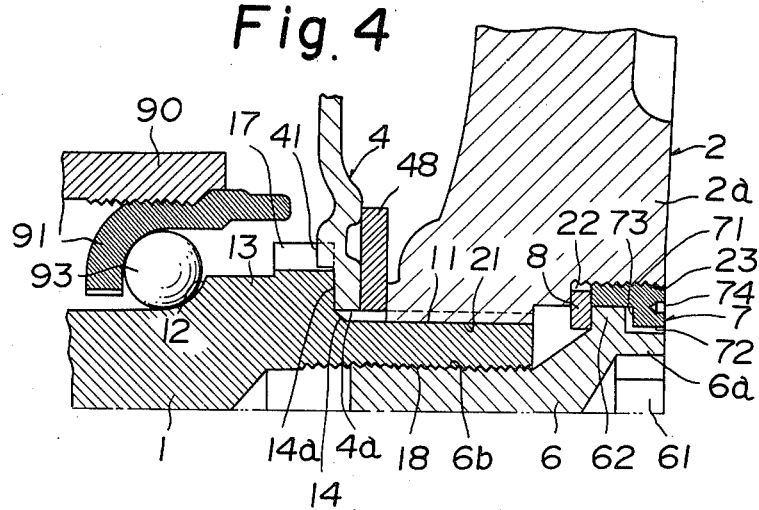
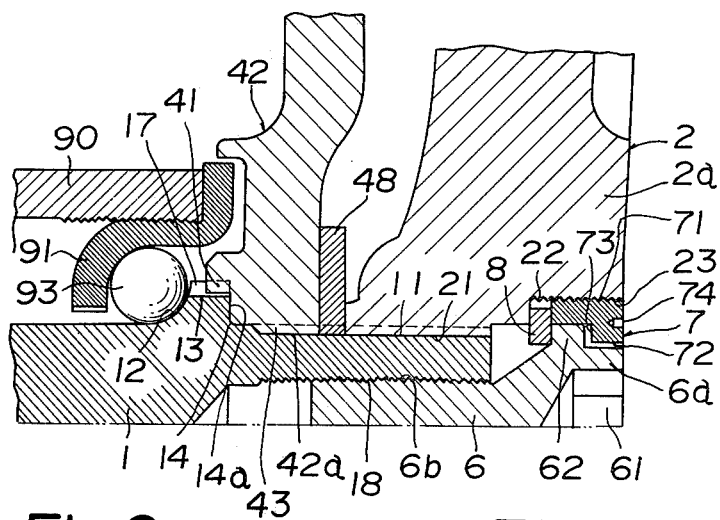
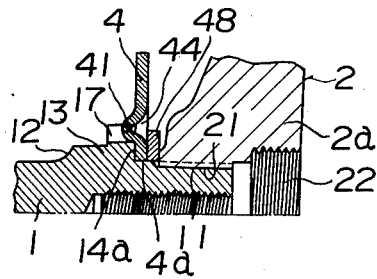
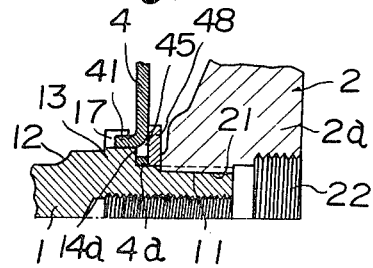

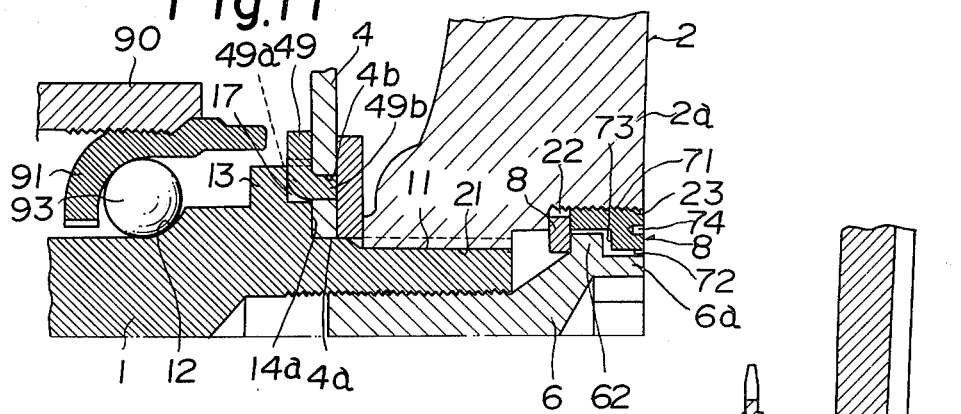
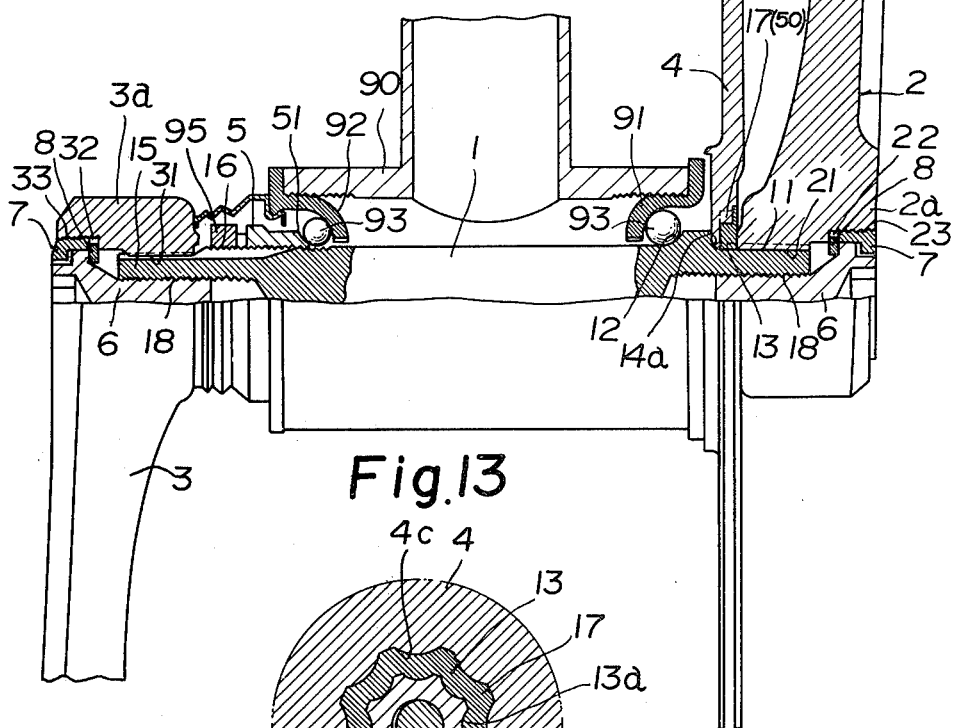
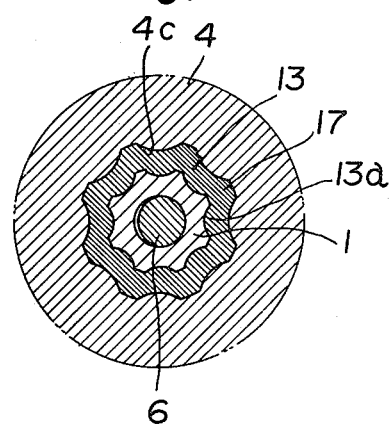

GEAR CRANK FOR A BICYCLE

This invention relates to a gear crank for a bicycle, and more particularly to a gear crank comprising a crank shaft, a pair of crank arms and a chain gear.

Conventionally, this kind of gear crank comprises a pair of crank arms having at bosses thereof, insertion bores with which the crank arms are respectively inserted onto the outer peripheries of opposite ends of the crank shaft so as to be fixed thereto by cotter pins or bolts. At the boss of the right-hand crank arm is provided a tubular shaft projecting outward from around the insertion bore, and the chain gear, formed of a punched metallic plate, such as steel, having an insertion bore, or a gear adapter carrying at its outer periphery the chain gear and having an insertion bore, is inserted onto the tubular shaft through the insertion bore. The tubular shaft is then caulked at its utmost edge to fix the chain gear to the right-hand crank arm directly or through the adapter.

This conventional construction, however, includes two areas where a fitting of parts takes place namely, the fitting area of the crank arm onto the crank shaft and the fitting area of the chain gear or adapter onto the tubular shaft. Heretofore it has been difficult to complete the required fitting operations with high accuracy. Accordingly, the fit accuracy of both fit areas greatly affects the chain gear in its sideway motion with respect to the crank shaft, and moreover, the occurrence of sideway motion greatly depends upon the quality of the caulking process, which is difficult to exactly complete. Hence, reduction of sideway motion as the whole still remains unattainable.

To eliminate this defect in the attachment of chain gear to the right-hand crank arm, a gear crank has been proposed which has a number of male splines provided at one axial end of the crank arm and a number of female splines at an insertion bore of the right-hand crank arm and at a center bore of the chain gear, so that the chain gear and right-hand crank arm are fit to the crank shaft through the spline-connection. A screw member is screwed with the one axial end of crank shaft to fix the chain gear together with the right-hand crank arm to the crank shaft. This gear crank has an improved machining accuracy, but has a crank shaft which is smaller in diameter in comparison with the gear crank which fixes the chain gear to the tubular shaft at the right-hand crank arm. Consequently, the chain gear and right-hand crank arm must be rigidly fixed to the smaller diameter crank shaft which leads to a reduction in the circumferential fit area, resulting a reduced strength at the fixing position of the chain gear to the crank shaft.

This invention has been designed to overcome these problems. An object of the invention is to provide the gear crank capable of readily reducing sideway motion of a chain gear with respect to the crank shaft and of greatly increasing the strength at the fixed portion of the chain gear with respect to the crank shaft.

The gear crank of the invention has been designed from the observation that the chain gear is fixed to a smaller diameter crank shaft in comparison with the outer diameter of the chain gear so that when crank arms are rotated through pedalling, the fixing portion of the chain gear has a smaller strength with respect to the driving torque transmitted from the crank shaft. To remedy this problem the gear crank of the invention provides at one axial end of the crank arm at a side of the fixed chain gear, a larger diameter portion extending radially outwardly of the crank arm and with a stepped portion including a retaining face. The chain gear has, around an insertion bore thereof, a contacting face which contacts with the retaining face and which is engaged at a position radially outward from the insertion bore with the larger diameter portion of the gear crank. The crank arm, which is connected to the one axial end of the crank shaft by a connecting means, biases the chain gear toward the retaining face to allow the contacting face to contact with the retaining face and the chain gear to engage with the larger diameter portion, thereby fixing the chain gear to the crank shaft with sufficient strength and without sideway motion of the chain gear.

Incidentally, the term "chain gear" is used merely for convenience of explanation. The term includes both a separate chain gear as well as a chain gear fixed to an adapter. In the latter case the chain gear is engaged with the larger diameter portion through the adapter.

Figure 14:
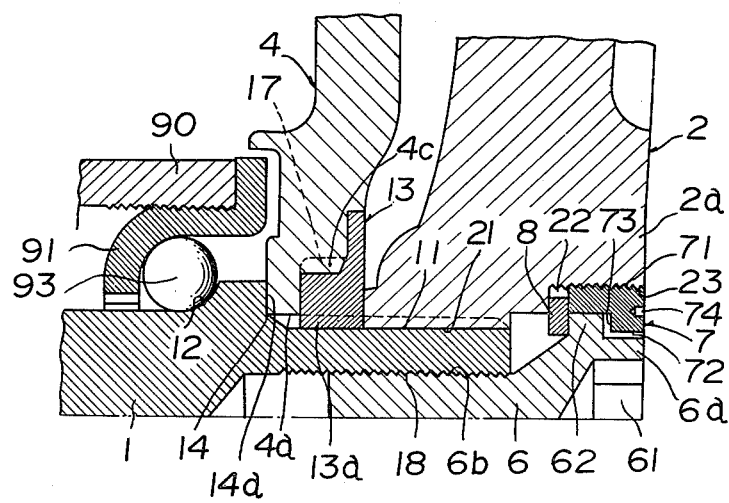
Figure 15:
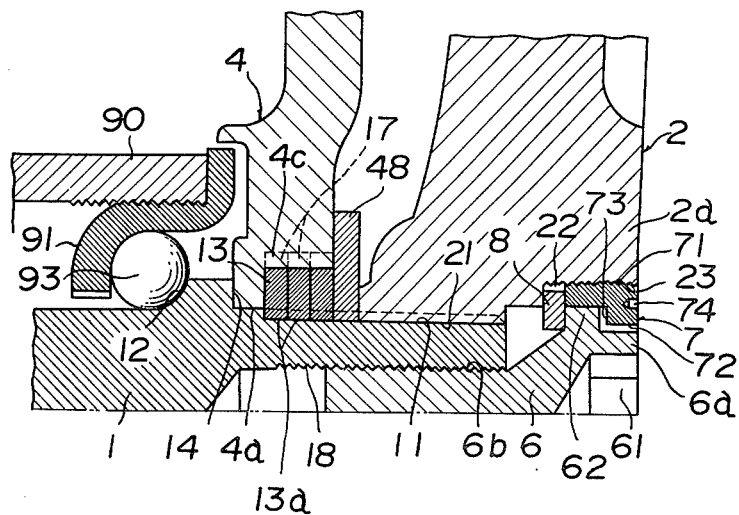

These and other objects and novel features of the invention will be more apparent from the following description of embodiments thereof taken in accordance with the accompanying drawings, in which:

FIG. 1 is a partially cutway front view of a first embodiment of the invention,

FIG. 2 is a sectional view of a chain gear fixing portion at the first embodiment, FIG. 3 is a sectional view of a right-hand crank arm fixing portion thereof, FIG. 4 is a partially enlarged sectional view of the first embodiment, FIGS. 5 through 11 are partially sectional views of modifications of the first embodiment shown in FIGS. 1 and 4, which correspond to FIG. 4 respectively, FIG. 12 is a partially cutaway front view of a second embodiment of the invention, FIG. 13 is a sectional view of a chain gear fixing portion thereof, FIG. 14 is a partially enlarged sectional view of the second embodiment in FIG. 12, and FIG. 15 is a partially enlarged sectional view of a modification of the second embodiment, which corresponds to FIG. 14.

Referring to FIGS. 1 and 12, the gear crank of the invention comprises a crank shaft 1 having a first and second axial end portion (at the right side and left side in the drawings), a pair of (right- and left-hand) crank arms 2 and 3 connected to the first and second end portions through connecting means to be hereinafter described, and at least one chain gear 4 mounted to the first end portion at the crank shaft 1.

The crank shaft 1 is provided at the first end portion thereof with a tapered insertion portion 11 for connecting with the right-hand crank arm 2 and with a ball race 12 for carrying balls 93 through which the crank shaft 1 is rotatably supported to the bottom bracket lug 90. The second end portion is provided with a tapered insertion portion 15 for connecting with the left crank arm 3 and with screw thread 16 through which a ball holder 5 having a ball race 51 is screwed with the crank shaft 1. The crank arms 2 and 3 are fit onto the insertion portions 11 and 15 at the first and second end portions of the crank shaft 1 and rigidly connected thereto by a first and a second connecting means to be hereinafter described.

The crank arms 2 and 3 each carry at one lengthwise end thereof pedals (not shown) pivoted thereto and have at the other ends bosses 2a and 3a respectively. The bosses 2a and 3a have at the centers thereof tapered insertion bores 21 and 31, which are inserted onto the insertion portions 11 and 15 at the crank shaft 1 to mount the crank arms 2 and 3 thereto. At the inner peripheries of insertion bores 21 and 31 of the crank arms 2 and 3 and at the outer peripheries of the insertion portions 11 and 15 of the crank shaft 1 are provided female and male splines, through which the crank arms 2 and 3 are connected not-rotatably with respect to the crank shaft 1.

The first and second connecting means comprise threaded bores 18 at the radial centers of insertion portions 11 and 15 at the crank shaft 1 and screw members 6 screwable with the threaded bores 18, whereby the screw members 6 are screwed to connect the crank arms 2 and 3 with the crank shaft 1.

Each of the screw members 6, as shown in the drawings, comprises a headed bolt. The bolt is provided at the center of the head with a polygonal control recesses 61, at the outer periphery with a flange 62, and at the outer periphery of the stem with screw thread 6b. The screw members 6 are screwed through the threads 6b with the threaded bores 18 at the crank shaft 1 and are screwably tightened to move the crank arms 2 and 3 into pressing contact with the insertion portions 11 and 15 respectively.

Referring to the drawings, recesses 22 and 32 for receiving the flanges 62 of screw members 6 are formed at the axially outward portion of insertion bores 21 and 31, and screw threads 23 and 33 are provided at the inner peripheries of the recesses 22 and 32 and are detachably screwed with stoppers 7 respectively. In addition, reference numeral 8 designates washers.

The stoppers 7 are cylindrical and have at their outer peripheries screw threads 71 corresponding to the threads 23 and 33. The central bore 72 of each stopper 7 receives the head 6a of screw member 6 and has at its inner periphery a stepped portion 73 facing and engageable with the axially outward lateral side of flange 62. Also, a rotary control area 74 is provided at the axially outer surface of each stopper 7. When each of the screw members 6 is unscrewed, the flange 62 thereof engages with the stepped portion 73 to axially bias the stopper 7, whereby thrust from the unscrewed screw member 6 causes each stopper 7 to be integrated with each of the crank arms 2 and 3. Hence, the screw members 6 are restrained from moving axially with respect to the crank arms 2 and 3 and crank arms 2 and 3 are made easily removable from the crank shaft 1.

The chain gear 4 mounted to the first end portion of crank shaft 1 is generally formed by punching a metallic plate and has a central bore 4a of a slightly larger diameter than an outer diameter of the insertion portion 11. The chain gear 4 is fit directly to the insertion portion 11 through a mounting construction to be hereinafter described. As an alternative arrangement, the chain gear 4 may, as shown in FIG. 5, be fit to the crank shaft 1 through an adapter 42 which carries the chain gear 4 and has an insertion bore 42a of slightly larger diameter than an outer diameter of the insertion portion 11.

Referring to FIGS. 1 and 12, reference numerals 91 and 92 designate cups screwed with both axial ends of the bottom bracket lug 90. Between the ball races at the cups 91 and 92 and the ball race 12 at the first end portion of crank shaft 1 and ball race 51 at the ball holder 5 screwed with the second end portion, are inserted balls 93 through which the crank shaft 1 is supported rotatably to the bottom bracket lug 90. In addition, reference numeral 95 designates a lock nut and 96 designates a chain case.

The first embodiment of the invention is shown in FIGS. 1 through 4, in which the gear crank constructed as described above is provided with (1) a larger diameter portion 13 formed between the insertion portion 11 and the ball race 12 at the first end portion of crank shaft 1, the larger diameter portion 13 extending radially outward of the crank shaft 1 and being integrated therewith; (2) a stepped portion 14 in continuation of the larger diameter portion 13 and having a retaining face 14a directed axially outward of the first end portion; (3) a contacting face formed around the insertion bore 4a at the chain gear 4 (including the adapter when used) and in contact with the retaining face 14a; and (4) an engaging means formed between the larger diameter portion 13 and the portion radially outward with respect to the insertion bore 4a at the chain gear 4 for preventing the chain gear 4 from rotating with respect to the crank shaft 1.

In greater detail, a plurality of splines 17 extending axially of the crank shaft are provided at the outer periphery of larger diameter portion 13 thereof and a plurality of projections 41 engageable with the splines 17 are provided at the chain gear 4 around the insertion bore 4a thereof and radially outward of the contacting face at the chain gear 4. The engagement of splines 17 with projections 41 connects the chain gear 4 with the larger diameter portion 13 making the chain gear 4 non-rotatable with respect to the crank shaft 1. The first connecting means, i.e., screw member 6, for connecting the right-hand crank arm 2 to the crank shaft 1 is screwably tightened to bias the right-hand crank arm toward the retaining face 14a, whereby the contacting face of chain gear 4 is brought into contact with the retaining face 14a, thus restraining the chain gear 4 from axial movement. Thus, the contact of the contacting face with the retaining face 14a allows the projections 41 to rigidly engage with the splines 17, thereby reliably preventing the chain gear 4 from rotating and axially moving with respect to the crank shaft 1.

Furthermore, in this embodiment, the larger diameter portion 13, which is integrated with the crank shaft 1, enables the chain gear 4 to be rigidly fixed without sideway motion thereof.

Incidentally, the larger diameter portion 13, when utilizing an integrated ball race 12 as shown in FIGS. 1, 4 and 5, can simplify machining of the same. Alternatively, a larger diameter portion for supporting the chain gear may be provided separately from the ball race 12 but integrally with the crank shaft 1 as shown in FIGS. 6 through 9.

When an adapter 42 is applied to the chain gear 4, it may be provided with the projections 41 as shown in FIG. 5. It is preferable that the inner periphery of the insertion bore 4a at the chain gear 4, especially the inner periphery of the insertion bore 42a at the adapter 42 when in use, be provided with female splines fit to the male splines on the insertion portion 11 at the crank shaft 1.

The projections 41 at the chain gear 4 shown in FIGS. 1 and 4 are pressed into a chevron-like shape when machining the chain gear 4. The projections 41 may be formed as shown in FIGS. 6 and 7. Referring to FIG. 6, a number of pairs of radially extending and regularly circumferentially spaced slots 44 are provided at the chain gear 4, so that each chain gear portion sandwiched by each pair of slots is curved widthwise outwardly of the chain gear 4. In FIG. 7, a number of U-like shaped slots 45 spaced at regular intervals circumferentially of the chain gear 4 are provided thereat and each tongue formed by each of the U-like slots 45 is bent at right angles with respect to the chain gear 4 respectively.

Figure 9:
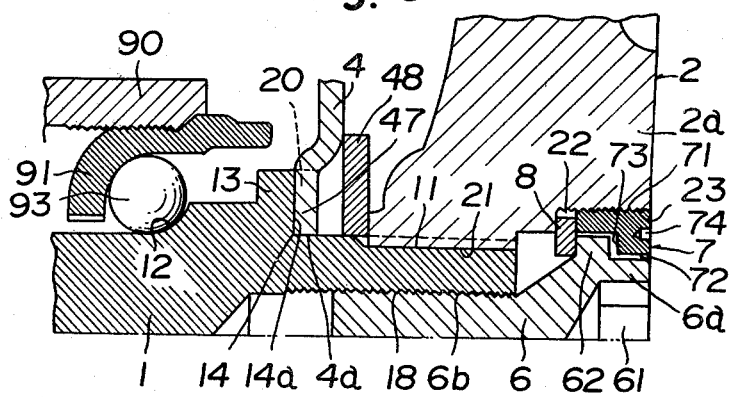

The engaging means, other than being formed as splines 17 at the outer periphery of the larger diameter portion 13 and projections 41, may be constructed as shown in FIGS. 8 and 9. Referring to FIG. 8, at the outer periphery of the larger diameter portion 13 at the crank shaft 1 are provided a number of projections 19 extending axially outward from the retaining face 14a and at the chain gear 4 are provided a number of through bores 46 receiving therethrough the projections 19 respectively. In FIG. 9, at the stepped portion 14 are provided a number of splines 20 and at the contacting face of chain gear 4 are provided a number of splines 47 projecting widthwise thereof, so that the splines 47 are engaged with the splines 20. In addition, in FIGS. 1 and 4 through 9, reference numeral 48 designates a washer inserted between the chain gear 4 and the right-hand crank arm 2.

Figure 10:
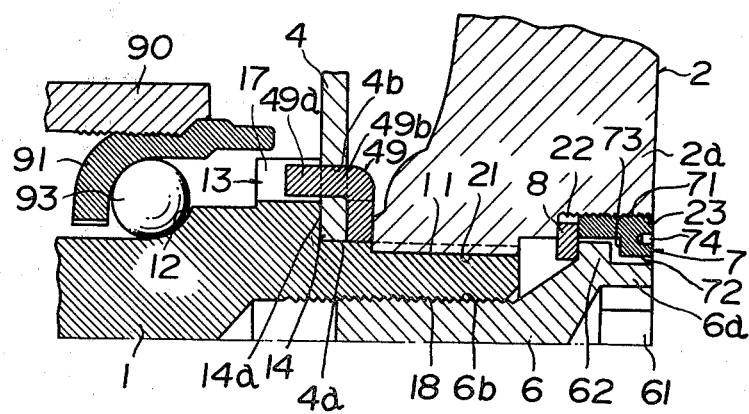

Furthermore, the engaging means, other than being provided between the larger diameter portion 13 and the chain gear 4 as shown in FIGS. 1 and 4 through 9, may employ retainers 49 separate from the larger diameter portion 13 and chain gear 4 as shown in FIGS. 10 and 11. Referring to FIGS. 10 and 11, a plurality of splines 17 are provided at the outer periphery of the larger diameter portion 13, a plurality of through bores 4b are provided at the chain gear 4, and the retainers 49 are provided with first engaging portions 49a in engagement with the splines 17 at the larger diameter portion 13 and with second engaging portions 49b in insertable engagement with the through bores 4b respectively.

A second embodiment of the invention is shown in FIGS. 12 through 15.

The second embodiment has the larger diameter portion 13 separated from the crank shaft 1, positioned axially outward with respect to the stepped portion 14, and spline-connected with the splines at the insertion portion 11 at the first end portion of crank shaft 1. Referring to FIGS. 12 through 14, the larger diameter portion 13 is formed of a disc of larger diameter than the outer diameter of crank shaft 1, and has at the center a central bore 13a having splines fit to those at the insertion portion 11 of crank shaft 1 so that the larger diameter portion 13 is spline-connected with the insertion portion 11 to thereby make the chain gear 4 not-rotatable with respect to the crank shaft 1. In addition, the larger diameter portion 13 has at its outer periphery the splines 17 similar to the first embodiment.

The chain gear 4, which is fixed to the crank shaft 1 through the larger diameter portion 13, is provided at one lateral side with a contacting face in contact with the retaining face 14a similar to the first embodiment and is annularly recessed at the other lateral side, the annular recess being provided at the inner periphery thereof with splines 4c engageable with the splines 17 at the larger diameter portion 13.

Referring to FIG. 15, the larger diameter portion 13 is formed of three discs and a washer 48 is used similar to the first embodiment. Other than this, the construction of FIG. 15 is similar to that shown in FIGS. 12 through 14.

Also, in the second embodiment the chain gear 4 is not-rotatably supported by the larger diameter portion 13 and the right-hand crank arm 2 is biased toward the retaining face 14a by the first connecting means to allow the contacting face at the chain gear 4 to contact with the retaining face 14a, whereby the chain gear 4 is fixed and cannot axially move. Hence, the splines 17 at the larger diameter portion 13 are engaged with the splines 4c at the chain gear 4 simultaneously with contact of the contacting face thereof with the retaining face 14a, thereby fixing the chain gear 4 to the crank shaft 1 in relation of being non-rotatable and non-axially movable with respect thereto.

As clearly understood from above description, the gear crank of the invention is constructed such that the crank shaft is provided at its firstend portion with the larger diameter portion so that the chain gear may be connected not-rotatably with respect to the crank shaft through the larger diameter portion. Furthermore, the connection is carried out by contacting the contacting face of the chain gear with the retaining face at the first end portion of the crank shaft, whereby sideway motion of chain gear with respect to the crank shaft is prevented and the fixed portion of chain gear is strong because the circumferential fit area at the fixed portion is made much larger than in the conventional gear crank where the chain gear is mounted directly to the crank shaft.

Hence, even when subjected to greater torque, the fixed portion of chain gear is prevented from breaking and the chain gear is usable for a long time.

While preferred embodiments of the invention have been described using specific terms, such description is for illustrative purpose only, and it is to be understood that changes and variations may be made without departing from the spirit or scope of the invention which is defined in the following claims.

What is claimed is:

1. A gear crank for a bicycle, comprising a crank shaft having a first and a second end portion; a pair of crank arms respectively connected to the first and second end portion of said crank shaft; at least one chain gear mounted to said first end portion of said crank shaft, said crank shaft having at said first end portion an integral larger diameter portion extending radially outward of said first end portion and a stepped portion having a retaining face directed axially outward of said first end portion, said chain gear having at its center an insertion bore fit into said first end portion of said crank shaft and, around said insertion bore, a contact face contacting with said retaining face; a number of axially extending splines provided at the outer periphery of said larger diameter portion and projections respectively engageable with said splines provided at said chain gear at a position axially outward with respect to said insertion bore for restraining said chain gear from rotation with respect to said crank shaft; and a first and second connecting means respectively provided between said crank arms and said first and second end portions of said crank shaft for connecting said crank arms to said first and second end portions, said first connecting means connecting one of said crank arms to said first end portion and biassing said one crank arm toward said retaining face to allow said contact face at said chain gear to contact with said retaining face.

2. A gear crank for a bicycle, comprising a crank shaft having a first and a second end portion; a pair of crank arms respectively connected to the first and second end portion of said crank shaft; at least one chain gear mounted to said first end portion of said crank shaft, said crank shaft having at said first end portion an integral larger diameter portion extending radially outward of said first end portion and a stepped portion having a retaining face directed axially outward of said first end portion, said chain gear having at its center an insertion bore fit onto said first end portion of said crank shaft and, around said insertion bore, a contact face contacting with said retaining face; splines provided at said larger diameter portion, through bores provided at the said chain gear at a position radially outward with respect to said insertion bore, and retainers provided separately from said larger diameter portion and chain gear, said retainers having first and second engaging portions in engagement with said splines at said larger diameter portion and with said through bores at said chain gear respectively, whereby said retainers enable said larger diameter portion to engage with said chain gear for restraining said chain gear from rotation with respect to said crank shaft; and a first and second connecting means respectively provided between said crank arms and said first and second end portions of said crank shaft for connecting said crank arms to said first and second end portions, said first connecting means connecting one of said crank arms to said first end portion and biassing said one crank arm toward said retaining face to allow said contact face at said chain gear to contact with said retaining face.

3. A gear crank for a bicycle according to claims 1 or 2, wherein said larger diameter portion is provided with a ball race.

* * * * *